(12) United States Patent
Araujo Da Silva et al.

(10) Patent No.: US 8,232,338 B2
(45) Date of Patent: Jul. 31, 2012

(54) RUBBER COMPOSITION HAVING A VERY LOW ZINC CONTENT

(75) Inventors: José Carlos Araujo Da Silva, Pont-du-Chateau (FR); Anne Veyland, Marsat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 407 days.

(21) Appl. No.: 12/521,774

(22) PCT Filed: Dec. 21, 2007

(86) PCT No.: PCT/EP2007/011332
§ 371 (c)(1),
(2), (4) Date: Jun. 29, 2009

(87) PCT Pub. No.: WO2008/080582
PCT Pub. Date: Jul. 10, 2008

(65) Prior Publication Data
US 2010/0317795 A1 Dec. 16, 2010

(30) Foreign Application Priority Data
Dec. 28, 2006 (FR) ..................................... 06 11551

(51) Int. Cl.
*C08K 5/098* (2006.01)
(52) U.S. Cl. ...................... 524/399; 524/575.5; 524/571; 525/333.1; 525/370

(58) Field of Classification Search ................ 524/575.5, 524/571, 399; 525/333.1, 370
See application file for complete search history.

(56) References Cited

U.S. PATENT DOCUMENTS

| 1,984,247 A | * | 12/1934 | Cadwell | ..................... 524/575.5 |
| 6,046,266 A | | 4/2000 | Sandstrom et al. | |

FOREIGN PATENT DOCUMENTS

| CN | 1248591 | 3/2000 |
| EP | 0 864 606 A1 | 9/1998 |
| EP | 0 989 161 | 3/2000 |
| GB | 1 360 852 A | 7/1974 |

* cited by examiner

*Primary Examiner* — Ling Choi
(74) *Attorney, Agent, or Firm* — Cozen O'Connor

(57) ABSTRACT

A rubber composition based on at least one diene elastomer, containing less than 2 phr of zinc, phr meaning parts per hundred parts of rubber (elastomer), and based on at least one reinforcing filler and one sulphur-based crosslinking system, comprising a zinc carboxylate of formula: $(RCOO)_2Zn$, in which R represents a hydrocarbon group chosen from cyclic or non-cyclic, linear or branched alkyl groups having 1 to 16 carbon atoms, aryl groups, aralkyl groups or alkaryl groups having 1 to 16 carbon atoms. Also disclosed is a process for preparing such a rubber composition which is suitable for manufacturing tires or semi-finished products made of rubber intended for these tires.

26 Claims, No Drawings

RUBBER COMPOSITION HAVING A VERY LOW ZINC CONTENT

RELATED APPLICATIONS

This is a U.S. national stage under 35 USC §371 of application No. PCT/EP2007/011332, filed on Dec. 21, 2007.

This application claims the priority of French application no. 06/11551 filed Dec. 28, 2006, the content of which is hereby incorporated by reference.

FIELD OF THE INVENTION

The present invention relates to diene rubber compositions that can be used, in particular, for the manufacture of tires or semi-finished products for tires such as treads.

BACKGROUND OF THE INVENTION

The vulcanization of diene elastomers by sulphur is widely used in the rubber industry, in particular in the tire industry. In order to vulcanize diene elastomers, use is made of a relatively complex vulcanization system comprising, in addition to to sulphur, various vulcanization accelerators and also one or more vulcanization activators, most particularly derivatives of zinc such as zinc oxide (ZnO) alone or used with fatty acids.

Tire manufacturers seek solutions that allow zinc or its derivatives to be very greatly reduced or even, if possible, to be removed from their rubber formulations, due to the known environmental impact of these compounds, especially with respect to water and aquatic organisms (classified as R50 according to European Directive 671548/EC of 9 Dec. 1996).

It is found, however, that the reduction in the content of zinc oxide in particular in blends having a majority content of natural rubber such as those used in the tire treads of heavy-duty vehicles, leads to numerous drawbacks:
a drop in the number of sulphur bridges during vulcanization of the blends, which is expressed both by a reduction in the moduli of the blends and an increase in hysteresis, therefore an increase in the rolling resistance.

Of course, it would appear advantageous to remove or very greatly reduce the zinc by adapting the vulcanization system and, in particular, by increasing the sulphur content and also the content of other accelerators customarily used with zinc derivatives. However, a person skilled in the art knows that although increasing the content of sulphur and of accelerator actually makes it possible to attain a targeted bridge density, on the other hand it is at the expense of the compromise between the distribution of the sulphur network, that is to say the percentages of sulphur bridges formed with one sulphur atom, two sulphur atoms, more than two sulphur atoms, and the properties directly linked to the crosslinking such as the scorch time, the optimum curing time, etc. This being even more pronounced for elastomeric matrices predominantly based on natural rubber or synthetic isoprene.

In order to solve the problem of zinc elimination, it has therefore also been proposed to replace zinc oxide with another metal oxide, for example MgO, or else by a salt or oxide of a transition metal belonging to groups IIA, IVA, VA, VIA, VIIA or VIIIA of the Periodic Table of the Elements, particularly cobalt or nickel (see patent documents U.S. Pat. No. 6,506,827 and WO 2003/054081).

Such solutions are not really acceptable in the long term, from the point of view of environmental protection, in so far as they propose to replace one metal with another metal, while also doomed eventually to be dispersed in nature with the debris from the wearing down of tires, particularly that of treads that inevitably results from the various frictions due, for the most part, to the braking, acceleration and turning forces.

SUMMARY OF THE INVENTION

Applicant has found a novel solution that makes it possible to very significantly decrease the zinc content in rubber formulations, without replacing the zinc with another metal, while protecting the rubber compositions from all the aforementioned drawbacks.

Furthermore, the Applicant has observed, quite unexpectedly, that this novel solution, without deteriorating all the rubber properties, made it possible to considerably increase (by more than 10%) the wear resistance of tire treads that use such compositions and, consequently to increase the service life of the latter. This improved wear resistance also has the effect of reducing, over time, the tire debris on the ground due to rolling and the amount of worn tires that are intended for recycling, which also helps to protect the environment.

One aspect of the invention relates to a rubber composition, which can be used in particular for manufacturing tires, said rubber composition is based on at least one diene elastomer, containing less than 2 phr zinc, phr meaning parts per hundred parts of rubber (elastomer), and based on at least:
  one reinforcing filler;
  one sulphur-based crosslinking system;
  one zinc carboxylate of formula: $(RCOO)_2Zn$,
in which R represents a hydrocarbon group chosen from cyclic or non-cyclic, linear or branched alkyl groups having 1 to 16 carbon atoms, aryl groups, aralkyl groups or alkaryl groups having 1 to 16 carbon atoms.

Patent application KR-10-2004-0105992 describes the use of zinc carboxylate of formula $(RCOO)_2Zn$ where R represents a benzene group or $CH_3(CH_2)_{12}$ used as a vulcanization activator in combination with zinc oxide in ZnO proportions of the order of 7 phr with the aforementioned zinc carboxylate in an amount of the order of 1.5 phr, i.e. a total zinc content in the composition of around 5.6 phr of zinc. It is clear that the use of a zinc carboxylate, which furthermore does not come under the field of protection of the present invention, has the objective of improving the efficacy of ZnO and not at all of reducing the zinc content in the composition. On the contrary, this document encourages a person skilled in the art to use a specific zinc carboxylate in addition to ZnO and in combination with the latter.

A rubber composition according to an embodiment of the invention can be used for manufacturing tires or semi-finished products made of rubber intended for these tires, these semi-finished products being especially chosen from the group composed of treads, underlayers intended, for example, to be placed under these treads, crown plies, sidewalls, carcass plies, beads, protectors, inner tubes and airtight internal rubbers for tubeless tires.

Advantageously, an embodiment of the invention relates to a rubber composition in which the zinc content is between 0.2 and 1.5 phr, and more preferably still between 0.2 and 1 phr.

Preferably, in the zinc carboxylate of formula: $(RCOO)_2Zn$, R represents a hydrocarbon group having 1 to 11 carbon atoms, and preferably the zinc carboxylate is zinc 2-ethylhexanoate, zinc laurate or zinc acetate.

According to one embodiment of the invention, the diene elastomer comprises more than 40 phr of isoprene elastomer.

Advantageously, the reinforcing filler comprises carbon black in a content greater than 10 phr, preferably the reinforcing filler comprises predominantly carbon black.

According to another embodiment of the invention, the reinforcing filler comprises a blend of carbon black and an inorganic filler, in particular the inorganic filler comprises silica and more particularly the reinforcing filler comprises silica and carbon black, the amount of silica being less than or equal (by weight) to the amount of carbon black.

Preferably, the content of all the primary and secondary vulcanization accelerators and vulcanization activators of the vulcanization system is between 0.5 and 10 phr, and more preferably between 0.5 and 5 phr.

Another aspect of the invention relates to a process for preparing a rubber composition based on at least one diene elastomer, containing less than 2 phr of zinc. Incorporated, by kneading, into the diene elastomer are at least one reinforcing filler, and a sulphur-based crosslinking system comprising a zinc carboxylate of formula $(RCOO)_2Zn$, in which:
R represents a hydrocarbon group chosen from cyclic or non-cyclic, linear or branched alkyl groups having 1 to 16 carbon atoms, aryl groups, aralkyl groups or alkaryl groups having 1 to 16 carbon atoms.

The composition according to one embodiment of the invention is particularly suitable for the manufacture of tire treads intended for fitting on "heavy-duty vehicles" (that is to say underground trains, buses, heavy road transport vehicles (lorries, tractors, trailers), or off-road vehicles), aircraft, and civil engineering, agricultural or handling vehicles.

Another aspect of the invention relates to ground-contact systems for motor vehicles, these tires and semi-finished products themselves made of rubber, especially treads, when they comprise a rubber composition according to an embodiment of the invention. Such treads can be used for the manufacture of new tires or the retreading of used tires.

Another aspect of the invention relates to these ground-contact systems for motor vehicles, tires and treads both in the uncured state (i.e. before curing) and in the cured state (i.e. after crosslinking or vulcanization).

The invention and its advantages will be easily understood in light of the detailed description and the exemplary embodiments that follow.

DETAILED DESCRIPTION OF THE PREFERRED EMBODIMENTS OF THE INVENTION

The compositions of the invention are based: (i) on at least one diene elastomer, (ii) on at least one reinforcing filler, and on a sulphur-based vulcanization system comprising at least (iii) one zinc carboxylate of formula $(RCOO)_2Zn$.

The expression composition "based on", should be understood to mean, in the present application, a composition comprising the blend and/or the reaction product of the various constituents used, some of these base constituents (for example, the coupling agent and the inorganic filler) being capable of, or intended for reacting with one another, at least partly, during the various stages of manufacture of the compositions, in particular during their vulcanization (curing).

In the present description, unless expressly indicated otherwise, all the percentages (%) indicated are % by weight.
Diene Elastomer The term "elastomer" or "rubber" (the two terms being synonymous) of the "diene" type is understood in general to mean an elastomer resulting at least partly (i.e. a homopolymer or a copolymer) from diene monomers (monomers bearing two carbon-carbon double bonds, whether conjugated or not).

Diene elastomers may, in a known manner, be classified in two categories: those referred to as "essentially unsaturated" and those referred to as "essentially saturated". The term "essentially unsaturated" diene elastomer is understood to mean a diene elastomer resulting at least partly from conjugated diene monomers, having a number of diene units or units of diene origin (conjugated dienes) that is greater than 15% (mol %). Thus, for example, diene elastomers such as butyl rubbers or diene/-olefin copolymers of the EPDM type do not fall within this definition and may on the contrary be termed "essentially saturated" diene elastomers (small or very small number of units of diene origin, always less than 15%). Within the "essentially unsaturated" diene elastomer category, the term "highly unsaturated" diene elastomer is understood in particular to mean a diene elastomer having a number of units of diene origin (conjugated dienes) that is greater than 50%.

Given these definitions, it will be understood more particularly that a diene elastomer that can be used in the compositions according to the invention means:
(a) any homopolymer obtained by polymerizing a conjugated diene monomer having 4 to 12 carbon atoms;
(b) any copolymer obtained by copolymerizing one or more conjugated dienes with one another or with one or more vinyl aromatic compounds having 8 to 20 carbon atoms;
(c) a ternary copolymer obtained by copolymerizing ethylene, an -olefin having 3 to 6 carbon atoms with an unconjugated diene monomer having 6 to 12 carbon atoms, such as for example the elastomers obtained from ethylene, propylene and an unconjugated diene monomer of the aforementioned type, such as in particular 1,4 hexadiene, ethylidene norbornene and dicyclopentadiene; and
(d) a copolymer of isobutene and isoprene (butyl rubber), and also the halogenated, in particular chlorinated or brominated, versions of this type of copolymer.

Although the present invention applies to any type of diene elastomer, a person skilled in the art of tires will understand that it is preferably employed with essentially unsaturated diene elastomers, in particular of the (a) or (b) type above.

Suitable conjugated dienes are in particular: 1,3 butadiene, 2 methyl-1,3-butadiene, 2,3-di($C_1$-$C_5$ alkyl)-1,3-butadienes, such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, a 1,3-arylbutadiene, 1,3-pentadiene, and 2,4-hexadiene. Suitable vinyl aromatic compounds are, for example: styrene, ortho-, meta- and para-methylstirene, and the commercial "vinyl-toluene" mixture, para-tert-butylstirene, methoxystirenes, chlorostirenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which depends on the polymerization conditions used, in particular the presence or absence of a modifying and/or randomizing agent, and on the amounts of modifying and/or randomizing agent employed. The elastomers may for example be block, random, sequential or microsequential elastomers and may be prepared in dispersion or in solution. They may be coupled and/or star-branched or else functionalized with a coupling and/or star-branching or functionalizing agent.

Suitable polymers are preferably polybutadienes, and in particular those having a content of -1,2 units between 4% and 80% and those having a content of cis-1,4 units greater than 80%, polyisoprenes, butadiene-stirene copolymers and in particular those having a stirene content between 5% and 50%, and more particularly between 20% and 40%, by weight, a -1,2 bond content of the butadiene part between 4% and 65% and a trans-1,4 bond content between 20% and 80%; butadiene-isoprene copolymers and especially those having an isoprene content between 5% and 90% by weight and a glass transition temperature ($T_g$, measured according to ASTM D3418) ranging from −40° C. to −80° C.; isoprene-stirene copolymers, and especially those having a stirene content between 5% and 50% by weight and a $T_g$ between −25° C. et −50° C. In the case of butadiene-stirene-isoprene copolymers, particularly suitable are those having a stirene content between 5% and 50%, and more particularly between 10% and 40%, by weight, an isoprene content between 15% and 60%, and more particularly between 20% and 50%, by weight, a butadiene content between 5% and 50%, and more particularly between 20% and 40%, by weight, a content of -1,2 units of the butadiene part between 4% and 85%, a content of trans-1,4 units of the butadiene part between 6% and 80%, a content of -1,2 plus -3,4 units of the isoprene part between 5% and 70% and a content of trans-1,4 units of the isoprene part between 10% and 50% and more generally any butadiene-stirene-isoprene copolymer having a $T_g$ between −20° C. and −70° C.

To summarize, the diene elastomer of the composition according to the invention is particularly preferably chosen from the group of (highly unsaturated) diene elastomers formed by polybutadienes (BR), synthetic polyisoprenes (IR), natural rubber (NR), butadiene copolymers, isoprene copolymers and blends of these elastomers. Such copolymers are more preferably chosen from the group formed by butadiene-stirene (SBR) copolymers, isoprene-butadiene (BIR) copolymers, isoprene-stirene (SIR) copolymers and isoprene-butadiene-stirene (SBIR) copolymers, and blend of such copolymers.

The composition according to the invention is especially intended, preferably, for a tire tread for a heavy-duty vehicle, the diene elastomer is preferably an isoprene elastomer, that is to say an isoprene homopolymer or copolymer, in other words a diene elastomer chosen from the group formed by natural rubber (NR), synthetic polyisoprenes (IR), the various isoprene copolymers or a blend of these elastomers. Among the isoprene copolymers, mention may in particular be made of isobutene-isoprene (butyl rubber IIR) copolymers, isoprene-stirene (SIR) copolymers, isoprene-butadiene (BIR) copolymers or isoprene-butadiene-stirene (SBIR) copolymers. This isoprene elastomer is preferably natural rubber or a synthetic cis-1,4 polyisoprene. Among these synthetic polyisoprenes, it is preferred to use polyisoprenes having a content (mot %) of cis-1,4 bonds greater than 90%, more preferably still greater than 98%. For such a tire for a heavy-duty vehicle, the diene elastomer may also be constituted, wholly or partly, of another highly unsaturated elastomer such as, for example, an SBR elastomer.

In particular, it is advantageous for the diene elastomer to contain at least 40 phr of isoprene elastomer.

In the case of a tire for a passenger vehicle; in such a case, the diene elastomer is preferably an SBR copolymer, in particular an SBR prepared in solution, preferably used as a blend with a polybutadiene; more preferably, the SBR has a stirene content between 20% and 30% by weight, a vinyl bond content of the butadiene part between 15% and 65%, a trans-1,4 bond content between 15% and 75% and a $T_g$ between −20° C. and −55° C., and the polybutadiene possesses more than 90% of cis-1,4 bonds.

The compositions of the treads of the invention may contain a single diene elastomer or a blend of several diene elastomers, the diene elastomer(s) possibly being used in combination with any type of synthetic elastomer other than a diene elastomer, or even with polymers other than elastomers, for example thermoplastic polymers.

Reinforcing Filler

As reinforcing filler, use is preferably made of carbon black in a proportion greater than 10 phr. The amount of carbon black may advantageously be greater than 30 phr, especially when this constitutes the only reinforcing filler or the majority reinforcing filler.

However, carbon black may of course be used as a blend with reinforcing fillers and in particular inorganic fillers. Such inorganic fillers comprise silica, preferably the latter in a tire application intended for a heavy-duty vehicle will remain in a proportion less than or equal, by weight, to the amount of carbon black.

More particularly, all carbon blacks, especially blacks of the HAF, ISAF or SAF type, conventionally used in tires and particularly in tire treads, are suitable as carbon blacks. As non-limiting examples of such blacks, mention may be made of the N115, N134, N234, N330, N339, N347 or N375 blacks.

In the case of the use of a silica, use is preferably made of a highly dispersible precipitated silica, in particular when the invention is employed for the manufacture of tires having a low rolling resistance; as non-limiting examples of such highly dispersible precipitated silicas, mention may be made of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber, and treated precipitated silicas such as, for example, the silicas "doped" with aluminium described in the aforementioned Application EP-A-0735088.

The reinforcing alumina ($Al_2O_3$) preferably used is a highly dispersible alumina having a BET surface area ranging from 30 to 400 $m^2/g$, more preferably between 60 and 250 $m^2/g$, an average particle size at most equal to 500 nm, more preferably at most equal to 200 nm. As non-limiting examples of such reinforcing aluminas, mention may especially be made of the "Baikalox A125" or "CR125" (Baiko wski), "APA-100RDX" (Condea), "Aluminoxid C" (Degussa) or "AKP-G015" (Sumitomo Chemicals) aluminas.

As other examples of an inorganic filler capable of being used in the rubber compositions of the invention, mention may also be made of aluminium (oxide-)hydroxides, aluminosilicates, titanium oxides, silicon carbides or nitrides, all of the reinforcing type as described in documents WO 99/28376 (or U.S. Pat. No. 6,610,261), WO 00/73372 (or U.S. Pat. No. 6,747,087), WO 02/053634 (or US2004-0030017), WO 2004/003067, WO 2004/056915.

Finally, a person skilled in the art will understand that as a filler equivalent to the reinforcing inorganic filler described in the present section, a reinforcing filler of another nature, especially of organic nature, could be used as long as this reinforcing filler is covered with an inorganic layer such as silica, or else comprises, at its surface, functional sites, especially hydroxyl sites, requiring the use of a coupling agent in order to establish the bond between the filler and the elastomer.

It is recalled here that the expression "coupling agent" is understood, in a known manner, to mean an agent capable of establishing a sufficient bond, of chemical and/or physical nature, between the inorganic filler and the diene elastomer; such an, at least bifunctional, coupling agent has for example the simplified general formula "Y-A-X", in which:

Y represents a functional group ("Y" function) that is capable of bonding physically and/or chemically to the inorganic filler, such a bond possibly being established, for example, between a silicon atom of the coupling agent and the surface hydroxyl (OH) groups of the inorganic filler (for example the surface silanols when it is a question of silica);

X represents a functional group ("X" function) capable of bonding physically and/or chemically to the diene elastomer, for example via a sulphur atom;

A represents a divalent group that makes it possible to bond Y and X.

Coupling agents, especially silica/diene elastomer coupling agents, have been described in a very large number of documents, the best known being bifunctional organosilanes bearing alkoxyl functions (that is to say, by definition, "alkoxysilanes") as "Y" functions and, as "X" functions, functions capable of reacting with the diene elastomer such as, for example, polysulphide functions.

Depending on the targeted application, it is also possible to add to the reinforcing filler (i.e. reinforcing inorganic filler plus carbon black, where appropriate), inert (non-reinforcing) fillers such as particles of clay, bentonite, talc, chalk, kaolin, which can be used, for example, in sidewalls or treads of coloured tires.

Various Additives

The rubber compositions according to the invention may also include all or some of the standard additives conventionally used in elastomer compositions intended for the manufacture of tires, such as for example plasticizers or extender oils, whether the latter are aromatic or non-aromatic nature, pigments, protective agents, such as anti-ozone waxes, chemical antiozonants, antioxidants, antifatigue agents, reinforcing resins, methylene acceptors (for example phenolic-novolac resin) or methylene donors (for example HMT or H3M) such as described, for example, in Application WO 02/10269 (or US2003-0212185).

In particular, in applications such as tire sidewalls, a person skilled in the art may make use of plasticizers or extender oils, generally remaining within amounts less than or equal to 30 phr.

Vulcanization or Crosslinking System

The compositions also include a crosslinking system based either on sulphur, or on sulphur and/or peroxide and/or bismaleimide donors, vulcanization accelerators, and vulcanization activators. Of course, if an activator or an accelerator is based on zinc, the sum of the zinc-containing elements included in total in the composition must satisfy a total zinc content less than 2 phr, in accordance with the invention.

The vulcanization system itself is preferably based on sulphur and on a primary vulcanization accelerator, in particular on a sulphenamide-type accelerator, as chosen from the group formed by 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-tert-butyl-2-benzothiazyl sulphenamide (abbreviated to "TBBS"), N-tent-butyl-2-benzothiazyl sulphenimide (abbreviated to "TBSI") and the mixtures of these compounds.

Sulphur is used at a preferred content between 0.5 and 10 phr, more preferably between 0.5 and 5.0 phr, for example between 0.5 and 3.0 phr when the invention is applied to a tire tread. All of the primary and secondary vulcanization accelerators and vulcanization activators are used at a preferred content between 0.5 and 10 phr, more preferably between 0.5 and 5.0 phr, in particular when the invention applies to a tire tread.

The compositions according to the invention may comprise zinc oxides in a very small amount in order to limit the amount of zinc present in the composition, preferably in amounts below 0.5 phr. And advantageously the composition is free of zinc oxide, which is replaced by a zinc carboxylate.

The zinc carboxylates according to the invention are zinc carboxylates of formula $(RCOO)_2Zn$, in which R represents a hydrocarbon group chosen from cyclic or non-cyclic, linear or branched alkyl groups having 1 to 16 carbon atoms, aryl groups, aralkyl groups or alkaryl groups having 1 to 16 carbon atoms.

They are preferably used so that they constitute the only supply of zinc in the composition or, failing that, the main supply of zinc, so that the total amount of zinc in the composition is between 0.2 and 1.5 and more preferably between 0.2 and 1 phr.

The corresponding carboxylates, the radical R of which has between 1 and 11 carbon atoms, will preferably be noted, such as zinc acetate, corresponding to R with 1 carbon atom, zinc 2-ethylhexanoate, R with 7 carbon atoms, and zinc laurate, R with 11 carbon atoms.

Manufacture of Rubber Compositions

The invention also relates to a process for preparing a rubber composition based on a diene elastomer, containing less than 0.2 phr of zinc, characterized in that incorporated, by kneading, into the at least one diene elastomer are at least one reinforcing filler, and at least one sulphur-based crosslinking system comprising a zinc carboxylate of formula $(RCOO)_2Zn$, in which:

R represents a hydrocarbon group chosen from cyclic or non-cyclic, linear or branched alkyl groups having 1 to 16 carbon atoms, aryl groups, aralkyl groups or alkaryl groups having 1 to 16 carbon atoms.

The rubber compositions according to the invention are manufactured in suitable mixers, using two successive preparation stages according to a general procedure well known to a person skilled in the art: a first stage of thermomechanical working or kneading (sometimes referred to as a "non-productive" stage) at high temperature, up to a maximum temperature between 130° C. and 200° C., preferably between 145° C. and 185° C., followed by a second stage of mechanical working (sometimes referred to as a "productive" step) at a lower temperature, typically below 120° C., for example between 60° C. and 100° C., during which finishing stage the crosslinking or vulcanization system is incorporated.

According to one preferred embodiment of the invention, all the base constituents of the compositions of the invention, apart from the vulcanization system, namely the carbon black, an optional other reinforcing filler, an optional coupling agent, are intimately incorporated, by kneading, into the diene elastomer during the non-productive first stage, that is to say that at least these various base constituents are introduced into the mixer and thermomechanically kneaded, in one or more steps, until the maximum temperature between 130° C. and 200° C., preferably between 145° C. and 185° C., is reached.

By way of example, the first (non-productive) stage is carried out in a single thermomechanical step during which all the necessary constituents, the optional complementary covering agents or processing aids and other various additives, apart from the vulcanization system, are introduced into a suitable mixer such as a conventional internal mixer. The total kneading time, in this non-productive stage, is preferably between 1 and 15 min. After cooling the mixture thus obtained during the non-productive first stage, the vulcanization system is then incorporated at low temperature, generally in an external mixer such as a roll mill; all the ingredients are then mixed (productive stage) for a few minutes, for example between 2 and 15 min. The vulcanization system itself is preferably based on sulphur and a primary accelerator, preferably of sulphenamide type as explained in detail previously in the vulcanization system.

Various known secondary vulcanization accelerators or vulcanization activators are added to this vulcanization system, these being incorporated during the non-productive first stage and/or during the productive stage, including one or more zinc carboxylates of formula $(RCOO)_2Zn$ according to the invention, or even other zinc derivatives as long as the latter remain in the minority and below the amounts specified in the section on the vulcanization system, and optionally fatty acids such as stearic acid, guanidine derivatives (in particular, diphenylguanidine), etc.

The final composition thus obtained is then calendered, for example in the form of a sheet or a plate, especially for laboratory characterization, or else extruded in the form of a profiled rubber element that can be used for example as a tire tread for a passenger vehicle.

The vulcanization (or curing) is carried out in a known manner at a temperature generally between 130° C. and 200° C., for a sufficient time, which may for example vary between 5 and 90 min, depending in particular on the curing temperature, on the vulcanization system adopted and on the vulcanization kinetics of the composition in question.

To summarize, the process for preparing a rubber composition based on a diene elastomer, containing less than 0.2 phr of zinc, and comprising at least one reinforcing filler, and at least one sulphur-based crosslinking system comprising a zinc carboxylate of formula $(RCOO)_2Zn$, in which:
R represents a hydrocarbon group chosen from cyclic or non-cyclic, linear or branched alkyl groups having 1 to 16 carbon atoms, aryl groups, aralkyl groups or alkaryl groups having 1 to 16 carbon atoms,
comprises the following steps:
  incorporating the reinforcing filler and the zinc carboxylate of formula $(RCOO)_2Zn$ into the diene elastomer, in a mixer, by thermomechanically kneading the whole mixture, in one or more steps, until a maximum temperature between 130° C. aid 200° C. is reached;
  cooling the whole mixture to a temperature below 100° C., then incorporating: the vulcanization system, apart from the carboxylate already incorporated, this vulcanization system being such that the zinc content in the final composition is less than 2 phr;
  kneading all the ingredients up to a maximum temperature below 120° C.;
  extruding or calendering the rubber composition thus obtained.

Preferably, more than 80% by weight and preferably more than 90% of the zinc present in the composition is derived from the zinc carboxylate of formula $(RCOO)_2Zn$ and more preferably still 100% of the zinc of the composition is derived from said zinc carboxylate.

Exemplary Embodiments of the Invention

Test Measurements Used

The rubber compositions are characterized, before and after curing, as indicated below.
Scorch Time
The measurements are carried out at 130° C., in accordance with French standard NF T 43-005. The change in the consistency index as a function of time makes it possible to determine the scorch time of the rubber compositions, assessed in accordance with the aforementioned standard by the parameter T5 (case of a large rotor), expressed in minutes, and defined as being the time needed to obtain an increase in the consistency index (expressed in MU) of 5 units above the minimum value measured for this index.
Rheometry
The measurements are carried out at 150° C. with an oscillating-chamber rheometer according to the standard DIN 53529—part 3 (June 1983). The change in the rheometric torque, Torque, as a function of time describes the change in the stiffening of the composition as a result of the vulcanization reaction. The measurements are processed according to the standard DIN 53529—part 2 (March 1983): $t_0$ is the induction time, that is to say the time needed before the onset of the vulcanization reaction; $t_\alpha$ (for example, $t_{99}$) is the time needed to attain a conversion of $\alpha$ %, that is to say $\alpha$ % (for example, 99%) of the difference between the minimum and maximum torques. Also measured is the $1^{st}$ order conversion rate constant denoted by K (expressed in $min^{-1}$), calculated between 30% and 80% conversion, which makes it possible to assess the vulcanization kinetics.
Tensile Tests
These tensile tests make it possible to determine the elastic stresses and properties at break. Unless otherwise indicated, they are carried out in accordance with French standard NF T 46-002 of September 1988. The nominal secant modulus (or apparent stress, in MPa) at 100% elongation (denoted by M100) is measured in a second elongation (i.e. after an accommodation cycle at the extension rate prescribed for the measurement itself).

The tensile strengths (in MPa) and the elongations at break (in %) are also measured. All these tensile measurements are carried out at the temperature of 100° C.±2° C. and under standard hygrometry conditions (50±5% relative humidity), in accordance with French standard NF T 40-101 (December 1979).
Dynamic Properties
The dynamic properties $G^*$ and $\tan(\delta)_{max}$ are measured on a viscoanalyzer (Metravib VA4000), according to the ASTM D 5992-96 standard. The response of a specimen of vulcanized composition (cylindrical test piece 4 mm in thickness and 400 $mm^2$ in cross section), subjected to a sinusoidal stress in simple alternating shear at a frequency of 10 Hz, under standard temperature conditions (23° C.) according to the ASTM D 1349-99 standard, or depending on the case at a different temperature, is recorded. A scan with a strain amplitude ranging from 0.1 to 45% (forward cycle) and then from 45% to 0.1% (return cycle) is carried out. The results exploited are the complex dynamic shear modulus ($G^*$) and the loss factor $\tan(\delta)$. For the return cycle, the maximum value of $\tan(\delta)$ observed, denoted by $\tan(\delta)_{max}$, and the difference in complex modulus ($G^*$) between the 0.1 and 45% strain values (the Payne effect) are indicated.

EXAMPLES

The various compositions presented in the following tests are prepared in an identical manner as follows:
successively introduced into an internal mixer, filled to 70% and for which the initial chamber temperature was around 60° C., are the reinforcing filler (carbon black, other optional possible fillers and optionally coupling agent), the diene elastomer and also the various other ingredients including the secondary vulcanization accelerator but excluding the remainder of the vulcanization system. Next, a thermomechanical working stage (non-productive stage) is carried out in one step, which lasts in total around 3 to 4 minutes, until a maximum "dropping" temperature of around 165° C. is reached. The mixture thus obtained is recovered, cooled, then the remainder of the vulcanization system (sulphur and primary sulphenamide-type accelerator) is added in an external mixer (homo-finisher) at 30° C., by mixing everything (productive phase) for a suitable time (for example between 5 and 12 min).

The compositions thus obtained are then calendered either in the form of plates (thickness of 2 to 3 mm) or thin sheets of rubber in order to measure their physical or mechanical properties, or extruded in the form of treads.

Example 1

In this first example, a control composition is compared with a composition according to the invention, for various elastomeric matrices and reinforcing fillers, these two compositions differing only in their vulcanization system.

These control compositions and compositions according to the invention are intended for the manufacture of a tread for a tire for a heavy-duty motor vehicle.

The vulcanization system of the control compositions contains 3 phr of ZnO (i.e. 2.4 phr of zinc) whereas the vulcanization system of the compositions according to the invention do not contain ZnO or stearic acid but ZEH, zinc 2-ethylhexanoate, in a content 3 phr (i.e. 0.56 phr of zinc).

This replacement therefore corresponds to a reduction of 77% by weight in the amount of zinc in the composition. Of course, as is clearly apparent to a person skilled in the art, it is necessary to increase the content of sulphur and of primary vulcanization accelerator, while remaining within conventional proportions for use in a tire, in order to enable sufficient crosslinking. However, as highlighted in the introduction of the present application, the simple increase in the contents of sulphur and of primary accelerator (which nevertheless remains low) does not make it possible to compensate, in terms of rubber properties, for the large reduction of zinc in the composition.

The control compositions will be denoted by T and the compositions according to the invention by A, the number which follows denoting the formulation of the composition, thus:
  the compositions T1 and A1 contain only natural rubber as the diene elastomer and only carbon black as the reinforcing filler;
  the compositions T2 and A2 contain only natural rubber as the diene elastomer and a carbon black/silica blend as the reinforcing filler;
  the compositions T3 and A2 contain a blend of NR/BR/SBR as the diene elastomer and only carbon black as the reinforcing filler.

The formulations of the various compositions are presented in Table 1 below.

Table 2 gives the properties of the various aforementioned compositions after curing at 165° C. for 15 minutes.

Observed for the compositions T1 and A1 based on natural rubber and on carbon black, are a slight drop in the properties in terms of elongation and tensile strength, and a maintaining of MA100 and of $\tan(\delta)_{max}$, representative of the hysteresis.

It is therefore observed that the rubber properties between the control composition T1 and the composition A1 according to the invention are little affected by the replacement of 3 phr of ZnO with 3 phr of ZEH. This result is quite surprising since it corresponds to a drop in the amount of zinc in the composition of nearly 77% (from 2.4 phr of zinc with ZnO to 0.56 phr of zinc with the use of ZEH) and which nevertheless makes it possible to retain a same crosslinking density (MA100 very close for T1 and A1), that is to say a similar density of sulphur bridges formed even though the vulcanization activator has a much smaller amount of zinc element.

This result is all the more astonishing since, as has already been highlighted previously, a person skilled in the art knows that, to date, it has always been extremely prejudicial to reduce the amount of zinc for compositions based predominantly, and a fortiori exclusively, on natural rubber.

Furthermore, it is observed, also quite astonishingly, that the compositions T1 and A1 not only have an almost identical number of sulphur bridges, but also an identical distribution of these sulphur bridges, that is to say that these two compositions T1 and A1 have, compared to one another, the same percentage of sulphur bridges formed with a single sulphur atom, the same percentage of sulphur bridges formed with two sulphur atoms and the same percentage of sulphur bridges formed with more than two sulphur atoms. This identical distribution is synonymous with rubber properties linked to the crosslinking that are identical for the two compositions despite the considerable difference in the zinc content between the two.

Moreover, running tests on tires for heavy-duty vehicles were carried out with treads of rubbery composition T' 1 and A' 1 almost similar to T1 and A1, T'1 being the control composition (with 3 phr of ZnO) and A'1 the composition according to the invention (with 3 phr of ZEH). These tests revealed, for the tire having a tread of composition A'1 according to the invention, an increase in the wear resistance of 15% to compared to the tire having the control composition T'1, which is both a very surprising and very advantageous result.

For the compositions T2 and A2 based on natural rubber and that contain silica, no drop in the properties is observed on moving from T2 to A2 (the difference in the elongation at break not being significant) with, for A2 according to the invention, hysteresis properties ($\tan(\delta)_{max}$) similar to T2 and a crosslink density (MA100) that is even greater than that of T2.

Here too these results are particularly surprising and advantageous, all the more so as, on the contrary, a reduction in the sulphur bridges would be expected, linked to the presence of silica which is capable of reacting with the zinc carboxylate, here ZEH, and thus of making some of the zinc unavailable for its role in the creation of sulphur bridges.

It is therefore noted that the invention functions both with a 100% carbon black reinforcing filler and with a carbon black/silica blend.

For the compositions T3 and A3 based on an NR/BR/SBR blend, an overall maintaining of all of the properties of the composition A3 according to the invention relative to the composition T3 is also observed. However, in so far as these same results had been observed with natural rubber alone, they are less surprising for a person skilled in the art, who knows that synthetic rubbers are less dependent on the vulcanization activation system than natural rubber.

TABLE 1

| | Compositions | | | | | |
| --- | --- | --- | --- | --- | --- | --- |
| | T1 | A1 | T2 | A2 | T3 | A3 |
| NR (1) | 100 | 100 | 100 | 100 | 40 | 40 |
| BR (2) | — | — | — | — | 40 | 40 |
| SBR (3) | — | — | — | — | 20 | 20 |
| N234 | 47.5 | 47.5 | 42 | 42 | 54 | 54 |
| Silica (4) | — | — | 10 | 10 | — | — |
| Sulphur | 1.5 | 2 | 1 | 2 | 1.1 | 2 |
| CBS (5) | 0.6 | — | — | — | 1.1 | — |

TABLE 1-continued

| | Compositions | | | | | |
|---|---|---|---|---|---|---|
| | T1 | A1 | T2 | A2 | T3 | A3 |
| DCBS (6) | — | 1.6 | — | 2 | — | 0.6 |
| ZnO | 3 | — | 3 | — | 3 | — |
| ZEH (7) | — | 3 | — | 3 | — | 3 |
| Stearic acid | 2.5 | — | 2.5 | — | 2.5 | — |

(1) NR: natural rubber (peptized)
(2) BR: polybutadiene with 4.3% of 1,2; 2.7% of trans; 93% of cis-1,4 ($T_g$ = −106° C.)
(3) SBR: butadiene-stirene copolymer with 16% of stirene, 46% of trans-1,2 polybutadiene units, 25% of 1,2 polybutadiene units and 29% of cis polybutadiene units ($T_g$ = −65° C.)
(4) Zeosil 1165MP silica from Rhodia, of HDS type
(5) Accelerator: N-cyclohexyl-2-benzothiazyl sulphenamide (CBS)
(6) N,N-dicyclohexyl-2-benzothiazyl sulphenamide (DCBS)
(7) ZEH: zinc 2-ethylhexanoate (Schill and Seilacher)

TABLE 2

| | Compositions | | | | | |
|---|---|---|---|---|---|---|
| | T1 | A1 | T2 | A2 | T3 | A3 |
| Elongation at break (%) | 672 | 586 | 627 | 581 | 481 | 401 |
| Tensile strength (MPa) | 22 | 19 | 20 | 20 | 15 | 13 |
| MA100 | 2.15 | 2.18 | 2.12 | 2.29 | 2.06 | 2.07 |
| tan(δ)$_{max}$ | 0.125 | 0.127 | 0.129 | 0.126 | 0.169 | 0.168 |

Example 2

The purpose of this example is to compare the rheometric properties of compositions according to the invention, that is to say that include carboxylates according to the invention, relative to a control composition comprising ZnO (3 phr) as a vulcanization activator.

Two series of tests were carried out, one corresponding to a 77% reduction in the zinc content in the compositions according to the invention relative to the control composition and the second corresponding to a 90% reduction in the zinc content.

The control composition is the composition T1 of example 1, the composition A1 is identical to that of example 1 according to the invention which includes, as vulcanization activator, ZEH in a content of 3 phr (corresponding to a total zinc content in the composition of 0.56 phr).

The compositions B2 and C2 are according to the invention, their formulations are identical to that of A1 apart from the vulcanization activator, the content of which corresponds, in each composition, to a zinc content of 0.56 phr, and which are the following:

for B2: zinc acetate according to the invention, carboxylate of formula $(RCOO)_2Zn$ with R having 1 carbon atom, with a content of 1.86 phr;

for C2: zinc laurate according to the invention, carboxylate of formula $(RCOO)_2Zn$ with R having 11 carbon atoms, with a content of 3.93 phr.

For the second series of tests corresponding to a 90% reduction in the zinc content (i.e. 0.24 phr of zinc) in the compositions according to the invention relative to the same control composition T1, the compositions A3, B3 and C3 have the same formulation as the composition A1 of example 1 apart from the vulcanization activator:

for A3: ZEH according to the invention with a content of 1.3 phr;

for B3: zinc acetate according to the invention with a content of 0.81 phr;

for C3: zinc laurate according to the invention with a content of 1.71 phr.

All the compositions A1, B2, C2, A3, B3 and C3 therefore have the same sulphur content of 2 phr and the same content of primary vulcanization accelerator DCBS of 1.6 phr.

The results of the rheometric properties for the first series of tests with a 77% reduction in zinc relative to the control are given in table 3 and those of the second series of tests with a 90% reduction in the zinc content relative to the control are given in table 4.

For the first series of tests (77% reduction) in table 3 an increase in Torque is observed for the three compositions A1, B2 and C2 according to the invention relative to the control composition T1, which signifies a high crosslinking for the three compositions A1, B2 and C2.

Faster kinetics (K) and a shorter reaction time ($T_{99}$) for a very similar induction time ($T_0$) are also noted for A1, B2 and C2 compared to T1.

Consequently, contrary to what a person skilled in the art might have expected, an invariability, or even an improvement, is observed in the rheological properties of compositions A1, B2 and C2 according to the invention.

Table 4, which corresponds to the second series of test (90% reduction) leads almost to the same conclusions.

Furthermore, it will be noted that similar tests that include a different primary accelerator (TBBS instead of DCBS) confirmed the same results.

TABLE 3

| | Compositions | | | |
|---|---|---|---|---|
| | T1 | A1 | B2 | C2 |
| vulcanization activator | ZnO/stearic acid (3/2.5 phr) | ZEH (3 phr) | Zinc acetate (1.86 phr) | Zinc laurate (3.93 phr) |
| Torque (dN · m) | 6.7 | 7.9 | 7.6 | 8.2 |
| $T_0$ (mn) | 4.2 | 5.2 | 4.9 | 4.6 |
| $T_{99}$ (mn) | 20.1 | 18.6 | 15 | 12.9 |
| K (mn$^{-1}$) | 0.29 | 0.34 | 0.46 | 0.55 |

TABLE 4

| | Compositions | | | |
|---|---|---|---|---|
| | T1 | A3 | B3 | C3 |
| vulcanization activator | ZnO/stearic acid | ZEH (1.3 phr) | Zinc acetate (0.81 phr) | Zinc laurate (1.71 phr) |
| Torque (dN · m) | 6.7 | 7.2 | 6 | 6.8 |
| $T_0$ (mn) | 4.2 | 5.5 | 4.8 | 4.9 |
| $T_{99}$ (mn) | 20.1 | 13.7 | 12.4 | 11.1 |
| K (mn$^{-1}$) | 0.29 | 0.56 | 0.61 | 0.74 |

The invention claimed is:

1. A rubber composition based on at least one diene elastomer, containing zinc with a content between 0.2 and 1 phr, phr meaning parts per hundred parts of rubber (elastomer), and based on at least:
   one reinforcing filler; and
   one sulfur-based crosslinking system comprising a zinc carboxylate chosen from zinc laurate or zinc acetate.

2. The composition according to claim 1, wherein the diene elastomer comprises more than 40 phr of isoprene elastomer.

3. The composition according to claim 1, wherein the reinforcing filler comprises carbon black in a content greater than 10 phr.

4. The composition according to claim 3, wherein the reinforcing filler comprises predominantly carbon black.

5. The composition according to claim 3, wherein the reinforcing filler comprises a blend of carbon black and an inorganic filler.

6. The composition according to claim 5, wherein the inorganic filler comprises silica.

7. The composition according to claim 6, wherein the reinforcing filler comprises silica and carbon black, the amount of silica being less than or equal (by weight) to the amount of carbon black.

8. The composition according to claim 1, wherein the content of all the primary and secondary vulcanization accelerators and vulcanization activators of the vulcanization system is between 0.5 and 10 phr.

9. The composition according to claim 1, wherein the content of all the primary and secondary vulcanization accelerators and vulcanization activators of the vulcanization system is between 0.5 and 5 phr.

10. A process for preparing a rubber composition based on at least one diene elastomer, containing zinc with a content between 0.2 and 1 phr, wherein at least one reinforcing filler, and a sulfur-based crosslinking system comprising a zinc carboxylate chosen from zinc laurate or zinc acetate are incorporated, by kneading, into the diene elastomer.

11. The process according to claim 10, comprising the steps of:
   incorporating into the diene elastomer, in a mixer, the reinforcing filler and the zinc carboxylate by thermomechanically kneading the entire mixture, in one or more stages, until a maximum temperature between 130° C. and 200° C. is reached;
   cooling the entire mixture to a temperature below 100° C.;
   then incorporating: the vulcanization system apart from the carboxylate already incorporated, this vulcanization system being such that the zinc content in the final composition is less than 1 phr;
   kneading the entire mixture up to a maximum temperature below 120° C.; and
   extruding or calendaring the resulting rubber composition.

12. The process according to claim 10, wherein more than 80% of the zinc present in the composition is derived from zinc carboxylate.

13. The process according to claim 10, wherein more than 90% of the zinc present in the composition is derived from zinc carboxylate.

14. The process according to claim 10, wherein 100% of the zinc present in the rubber composition is derived from zinc carboxylate.

15. The process according to claim 10, wherein the diene elastomer comprises more than 40 phr of natural rubber and/or of synthetic polyisoprene.

16. The process according to claim 10, wherein the reinforcing filler comprises carbon black in a content greater than 10 phr.

17. The process according to claim 16, wherein the reinforcing filler comprises predominantly carbon black.

18. The process according to claim 16, wherein the reinforcing filler comprises a blend of carbon black and an inorganic filler.

19. The process according to claim 18, wherein the inorganic filler comprises silica.

20. The process according to claim 19, wherein the reinforcing filler comprises silica and carbon black, the amount of silica being less than or equal (by weight) to the amount of carbon black.

21. The process according to claim 10, wherein the content of all the primary and secondary vulcanization accelerators and vulcanization activators of the vulcanization system is between 0.5 and 10 phr.

22. The process according to claim 10, wherein the content of all the primary and secondary vulcanization accelerators and vulcanization activators of the vulcanization system is between 0.5 and 5 phr.

23. A ground-contact system for a motor vehicle comprising a rubber composition according to claim 1.

24. Tire A tire comprising a rubber composition according to claim 1.

25. A semi-finished product incorporated into the manufacture of a tire comprising a rubber composition according to claim 1.

26. A tire tread comprising a rubber composition according to claim 1.

* * * * *